(12) United States Patent
Jung et al.

(10) Patent No.: US 7,167,317 B2
(45) Date of Patent: Jan. 23, 2007

(54) OBJECTIVE OPTICAL SYSTEM EMPLOYING GRIN LENS

(75) Inventors: Mee-suk Jung, Suwon-si (KR);
Myung-bok Lee, Suwon-si (KR);
Eun-hyoung Cho, Seoul (KR);
Hae-sung Kim, Yongin-si (KR);
Jin-seung Sohn, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/871,567

(22) Filed: Jun. 21, 2004

(65) Prior Publication Data

US 2004/0257667 A1 Dec. 23, 2004

(30) Foreign Application Priority Data

Jun. 20, 2003 (KR) .................. 10-2003-0040084

(51) Int. Cl.
*G02B 3/00* (2006.01)
*G02B 9/00* (2006.01)
*G02B 13/18* (2006.01)
*G02B 3/02* (2006.01)

(52) U.S. Cl. .................. 359/652; 359/719

(58) Field of Classification Search ........ 359/652–654, 359/719
See application file for complete search history.

(56) References Cited

U.S. PATENT DOCUMENTS

| | | | | |
|---|---|---|---|---|
| 4,762,403 A | * | 8/1988 | Hattori ................ | 359/654 |
| 4,805,997 A | * | 2/1989 | Asahara et al. ........ | 359/652 |
| 4,852,981 A | * | 8/1989 | Suda ..................... | 359/654 |
| 5,044,737 A | * | 9/1991 | Blankenbecler ....... | 359/653 |
| 5,059,005 A | * | 10/1991 | Kawano .............. | 359/654 |
| 5,796,525 A | * | 8/1998 | Dempewolf et al. .. | 359/653 |
| 6,108,135 A | * | 8/2000 | Ho ....................... | 359/654 |
| 2003/0035361 A1 | * | 2/2003 | Knight et al. ........ | 369/112.24 |

FOREIGN PATENT DOCUMENTS

JP 07-234358 9/1995
JP 08-227002 9/1996

* cited by examiner

*Primary Examiner*—Alicia M Harrington
(74) *Attorney, Agent, or Firm*—Sughrue Mion, PLLC

(57) ABSTRACT

Provided is an objective optical system employing a gradient index (GRIN) lens. A refractive index of the GRIN lens is changed in an axial direction and a direction perpendicular to the axial direction. The GRIN lens has a refractive index n satisfying the following equation:

$$n(r, z) = \sum_{i=0} n_{r2i} r^{2i} + \sum_{j=0} n_{zj} z^{j}$$

where z is a distance from the center of the lens in the axial direction and r is a distance from the center of the lens in the direction perpendicular to the axial direction. Thus, an objective optical system with a high numerical aperture can correct aberration.

20 Claims, 4 Drawing Sheets

OBJECTIVE OPTICAL SYSTEM EMPLOYING GRIN LENS

This application claims the priority of Korean Patent Application No. 2003-40084, filed on Jun. 20, 2003, in the Korean Intellectual Property Office, the disclosure of which is incorporated herein in its entirety by reference.

BACKGROUND OF THE INVENTION

1. Field of the Invention

An apparatus consistent with the present invention relates to an objective optical system employing a gradient index (GRIN) lens and, more particularly, to an objective optical system employing a GRIN lens that can correct aberrations and can be used in an ultra-small optical pickup.

2. Description of the Related Art

Objective lenses are the main parts used in optical disk drives (ODDs), such as compact disks (CDs) or digital versatile disks (DVDs), to record or reproduce information. Objective lenses condense laser beams emitted from laser diodes, which are light sources, and focus the laser beams on recording surfaces of optical disks to record information. Objective lenses may also condense laser beams reflected from the optical disks and send the laser beams to photodetectors to reproduce the information recorded on the optical disks.

As demands for mobile systems (such as MP3s, personal digital assistants (PDAs), digital cameras, and camcorders) increase, studies of portable ultra-small optical disk drives are being vigorously made. Accordingly, ultra-thin optical pickups are being developed. In order to store more than 1 GB of information per optical disk, ultra-thin optical pickups use semiconductor laser beams having a blue wavelength of 400 nm to 410 nm and employ objective lenses having a numeral aperture (NA) higher than 0.85 to record and reproduce information on optical disks having a diameter smaller than 30 mm.

Objective lenses with a high NA should be able to remove chromatic aberration caused by a change in the wavelength of laser beams when temperatures of laser diodes are changed, and also correct spherical aberration and coma aberration according to the high NA.

To remove the chromatic aberration and coma aberration, three conventional methods have been used. The first method is to combine a concave lens made of a low dispersion optical glass with a convex lens made of a high dispersion optical glass. However, this method increases the weight and size of objective optical systems, and accordingly, is not suitable for ultra-thin optical pickups. The second method is to reduce chromatic aberration by using a low dispersion aspherical lens. However, the refractive index of the low dispersion optical glass used in this method is small and a curvature should be increased in order to correct coma aberration with respect to a high NA. Therefore, the second method is limited in correcting coma aberration generated in objective lenses with a high NA in ultra-small optical pickups.

The third method, as shown in FIG. 1, is to use a hybrid lens formed by combining a refractive lens R with a diffractive optical lens DOE. However, with this method, it is not easy to form a fine pitch when manufacturing the diffractive optical lens DOE and to obtain sufficient transmittance. In particular, for a doublet hybrid lens, it is difficult to bond the refractive lens R to the diffractive optical lens DOE, thereby requiring an additional process. Moreover, when the diffractive optical lens DOE is directed toward an optical disk, friction upon contact with the optical disk or contamination with particles may occur. In addition, light beams of an order other than zero and ±1 may become noise.

To solve these problems, U.S. Pat. Nos. 5,912,770, 6,233,217, 6,330,116, and 5,612,574 disclose optical systems employing gradient index (GRIN) lenses. GRIN lenses are one of the most important optical elements in micro optics. The GRIN lenses, which are used to collimate light beams emitted from light sources and condense light beams, are usually manufactured using an ion exchange technology. For example, FIG. 2 schematically illustrates an objective optical system in which a GRIN lens GR and a diffractive lens DR are used. However, a refractive index of the GRIN lens GR varies only in a radial direction and, in fact, all the GRIN lenses disclosed in the aforesaid references have refractive indices which vary only in one direction, either radial or axial. Hence, an additional optical element for correcting aberration is required and the conventional arts are not suitable for ultra-small optical pickups.

SUMMARY OF THE INVENTION

An apparatus consistent with present invention provides an objective optical system employing an ultra-thin gradient index (GRIN) lens that can remove coma aberration and chromatic aberration and can be used in an ultra-small optical pickup.

According to an aspect of the present invention, there is provided an objective optical system of an optical pickup, comprising a gradient index lens whose refractive index varies in an axial direction and a direction perpendicular to the axial direction.

The gradient index lens may have a refractive index n satisfying Equation 1:

$$n(r, z) = \sum_{i=0} n_{r2i} r^{2i} + \sum_{j=0} n_{zj} z^{j}$$

where z is a distance from the center of the lens in the axial direction and r is a distance from the center of the lens in the direction perpendicular to the axial direction.

According to another aspect of the present invention, there is provided an objective optical system of an optical pickup, comprising a gradient index lens having a refractive index n satisfying Equation 2:

$$n(z) = \sum_{j=0} n_j z^{j}$$

where z is a distance from the center of the lens in an axial direction.

According to still another aspect of the present invention, there is provided an objective optical system of an optical pickup, comprising a gradient index lens having a refractive index n satisfying Equation 3:

$$n(r) = \sum_{j=0} n_{2j} r^{2j}$$

where r is a distance from the center of the lens in a direction perpendicular to an axial direction.

When the gradient index lens has an incident surface which is a convex aspherical surface or a convex spherical surface, the gradient index lens may have an emissive surface which is a planar surface, a convex aspherical surface, a convex spherical surface, a concave aspherical surface, or a concave spherical surface.

The gradient index lens may be a sheet lens. In this case, a refractive lens having a convex incident surface and a planar emissive surface may be disposed in an optical path of light incident on the gradient index lens, and a refractive lens having a planar incident surface and a convex emissive surface may be disposed in an optical path of light emitted from the gradient index lens.

A diffractive optical lens having a diffractive surface may be further disposed in an optical path of light incident on or emitted from the gradient index lens.

A refractive lens may be further disposed in an optical path incident on or emitted from the gradient index lens.

A refractive lens may be further disposed in an optical path of light incident on the gradient index lens, and a diffractive optical lens having a diffractive surface may be further disposed in an optical path of light emitted from the gradient index lens.

A diffractive optical lens having a diffractive surface may be further disposed in an optical path of light incident on the gradient index lens, and a refractive lens may be further disposed in an optical path of light emitted from the gradient index lens.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

The present invention will now be described more fully with reference to the accompanying drawings, in which illustrative, non-limiting embodiments of the invention are shown.

Figure 1:
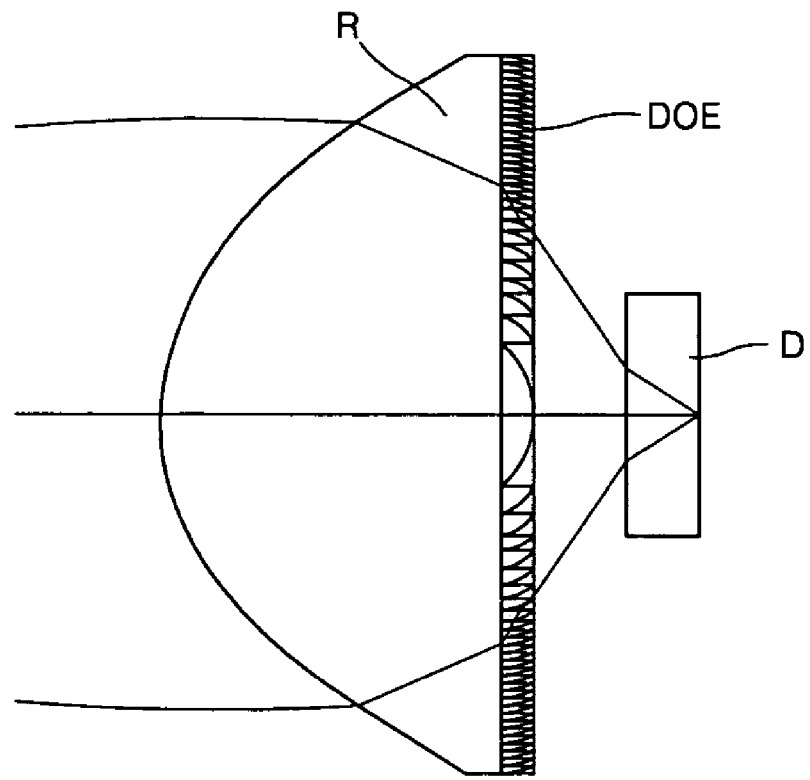
FIG. 1 is a schematic sectional view of a conventional hybrid lens.
Figure 2:
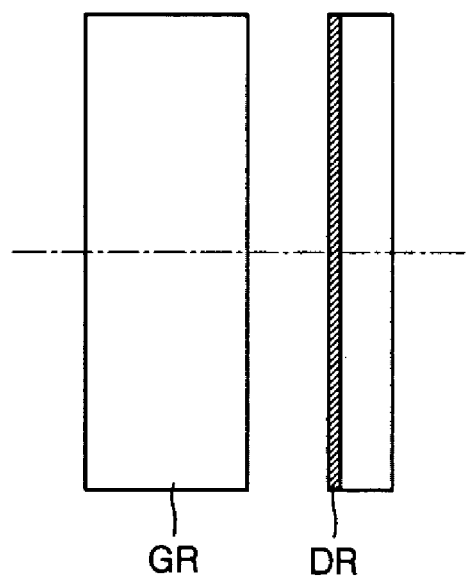
FIG. 2 is a schematic sectional view illustrating a configuration of an objective optical system consisting of a gradient index (GRIN) lens and a diffractive lens disclosed in U.S. Pat. No. 5,912,770.
Figure 3:
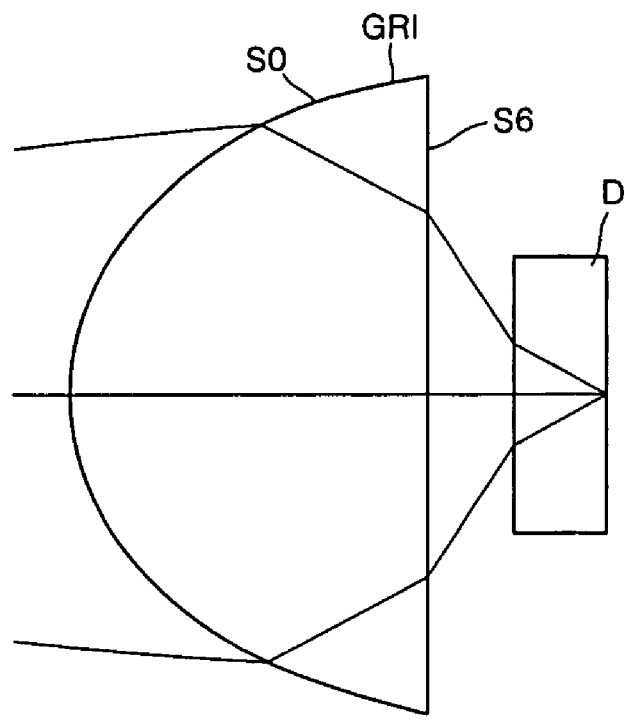
FIG. 3 is a schematic sectional view of an objective optical system according to a first preferred embodiment of the present invention.

FIG. 3 is a schematic sectional view of an objective optical system according to a first embodiment of the present invention. Referring to FIG. 3, the objective optical system employs a convex-plano gradient index (GRIN) lens GR1 as an objective lens. The GRIN lens GR1 forms a light spot having a desired size by focusing light on an optical disk D. The refractive index n of the GRIN lens GR1 may be changed as shown in Equations 4, 5 and 6. Equation 4 is equivalent to Equation 1, Equation 5 is equivalent to Equation 2 and Equation 6 is equivalent to Equation 3. A range of the refractive index n varies according to media from which the GRIN lens GR1 is made. It is preferable that the refractive index n is set in a range of a tolerance less than ±10%.

$$n(r, z) = n_0 + n_{r2}r^2 + n_{r4}r^4 + \ldots + n_{z1}z + n_{z2}z^2 + \quad \text{[Equation 4]}$$

$$n(z) = n_0 + n_1 z + n_2 z^2 + n_3 z^3 + n_4 z^4 + \quad \text{[Equation 5]}$$

$$n(r) = n_0 n_2 r^2 + n_4 r^4 + \quad \text{[Equation 6]}$$

In Equation 1 through Equation 6, z represents a distance from the center of the lens in an axial direction, and r represents a distance from the center of the lens in a direction perpendicular to the axial direction. In particular, when the axial direction is the Z-axis and the two axes perpendicular to the axial direction are the X and Y-axes, $r^2$ can be expressed as $x^2 + y^2$.

Figure 4:
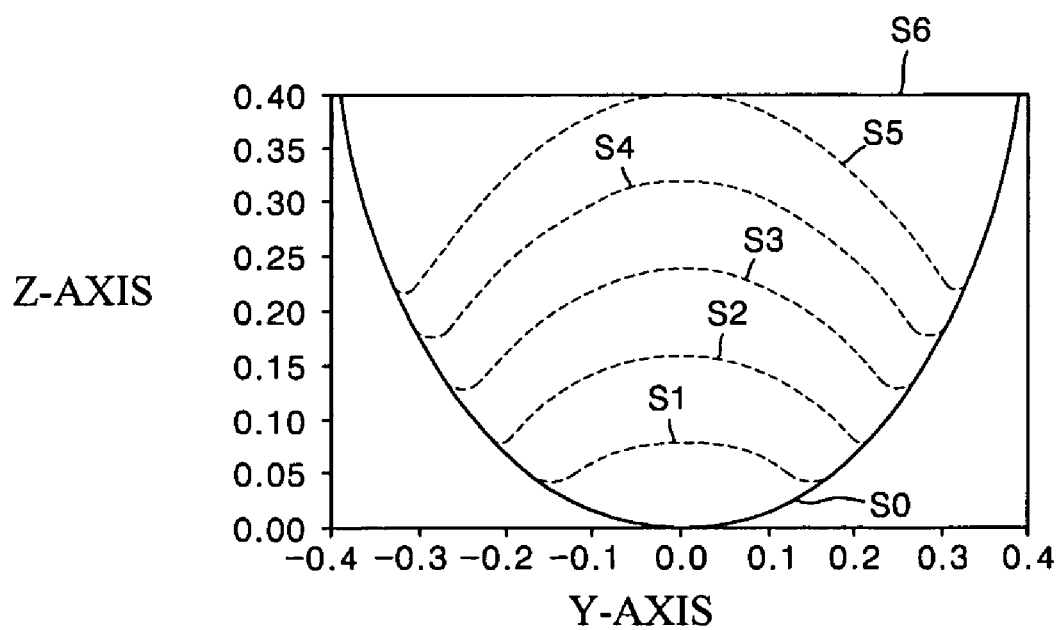
FIG. 4 is a graph illustrating refractive index distributions inside a convex-plano GRIN lens employed by the objective optical system shown in FIG. 3.

FIG. 4 is a graph illustrating the refractive index distributions inside the convex-plano GRIN lens GR1 shown in FIG. 3. Refractive surfaces having refractive index distributions inside the 0.4 mm thick GRIN lens GR1 are respectively represented as s1, s2, s3, s4, s5, and s6. Light is refracted through the refractive surfaces s1, s2, s3, s4, s5 and s6, and is focused on the optical disk D after passing through the final refractive surface s6.

Operation of the GRIN lens GR1 can be explained using an operational principle of a plurality of refractive lenses. When light is incident on an incident surface of a refractive lens, the light is refracted due to a difference in the refractive index between the air and a uniform medium of the incident surface. Then, the light is refracted again inside the refractive lens due to a change in the refractive index. Next, the light is refracted on an emissive surface again due to a difference in the refractive index between the emissive surface and the air. To create a good quality image using a refractive lens, the refractive lens must have an aspherical surface having a complicated curvature which requires a very elaborate manufacturing process, thereby making it difficult to have a small size and increasing manufacturing costs. However, the GRIN lens GR1 has the same effect as a refractive lens having a complicated curvature since the refractive index n inside a medium from which the GRIN lens GR1 is made is continuously changed.

Referring to FIG. 3 again, the GRIN lens GR1 has a convex aspherical incident surface s0 and a planar emissive surface s6. However, it is also possible that the GRIN lens GR1 has a convex emissive surface or a concave emissive surface instead of the planar emissive surface s6. When the emissive surface of the GRIN lens GR1 is convex or concave, the emissive surface can be spherical or aspherical. An aspherical surface $Z(r)$ satisfies a general expression given in Equation 7.

$$z(r) = \frac{cr^2}{1 + \sqrt{a - (1+k)c^2 r^2}} + Ar^4 + Br^6 + Cr^8 + Dr^{10} + \ldots \quad \text{[Equation 7]}$$

Here, c represents a curvature of the aspherical surface, k represents a conic constant, A, B, C and D respectively represent a fourth-, sixth-, eighth-, and tenth-order aspherical coefficient. If necessary, a refractive lens or a diffractive optical lens may be disposed in an optical path of light emitted from or incident on the GRIN lens GR1 to control the spot size of the focused light and more effectively control aberration.

Figure 5:
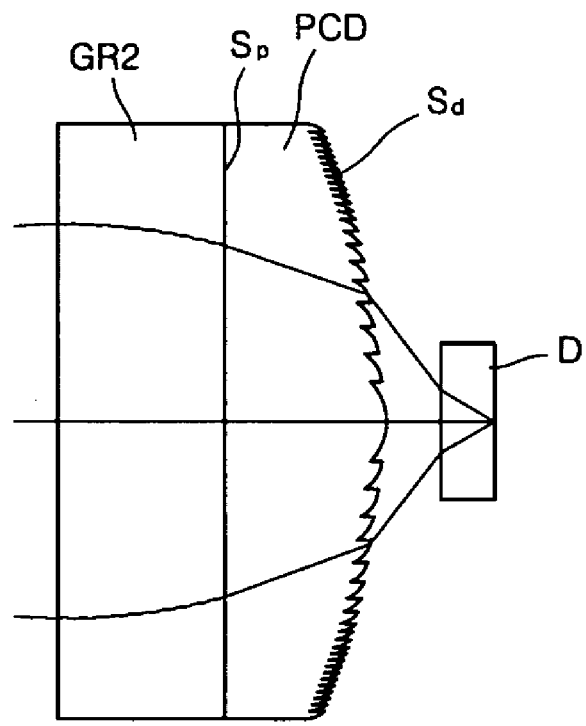
FIG. 5 is a schematic sectional view of an objective optical system according to a second preferred embodiment of the present invention.

FIG. 5 is a schematic sectional view illustrating a configuration of an objective optical system according to a second embodiment of the present invention. Referring to FIG. 5, the objective optical system comprises a GRIN sheet lens GR2 having a refractive index n satisfying one of Equation 1 through Equation 3 (Equation 4 through Equation 6) and a plano-convex diffractive lens PCD having a planar incident surface $s_p$ and a convex emissive surface $s_d$ disposed in an optical path of light emitted from the GRIN lens GR2.

Since the emissive surface $s_d$ of the plano-convex diffractive lens PCD is a diffractive surface, the plano-convex diffractive lens PCD separates light refracted by the GRIN lens GR2 into a plurality of diffracted light beams including a zero-order light beam, a +1-order light beam, and −1-order light beam. Here, the plano-convex diffractive lens PCD may directly contact an emissive surface of the GRIN lens GR2 or may be spaced apart from the emissive surface of the GRIN lens GR2 by a predetermined distance.

Figure 7:
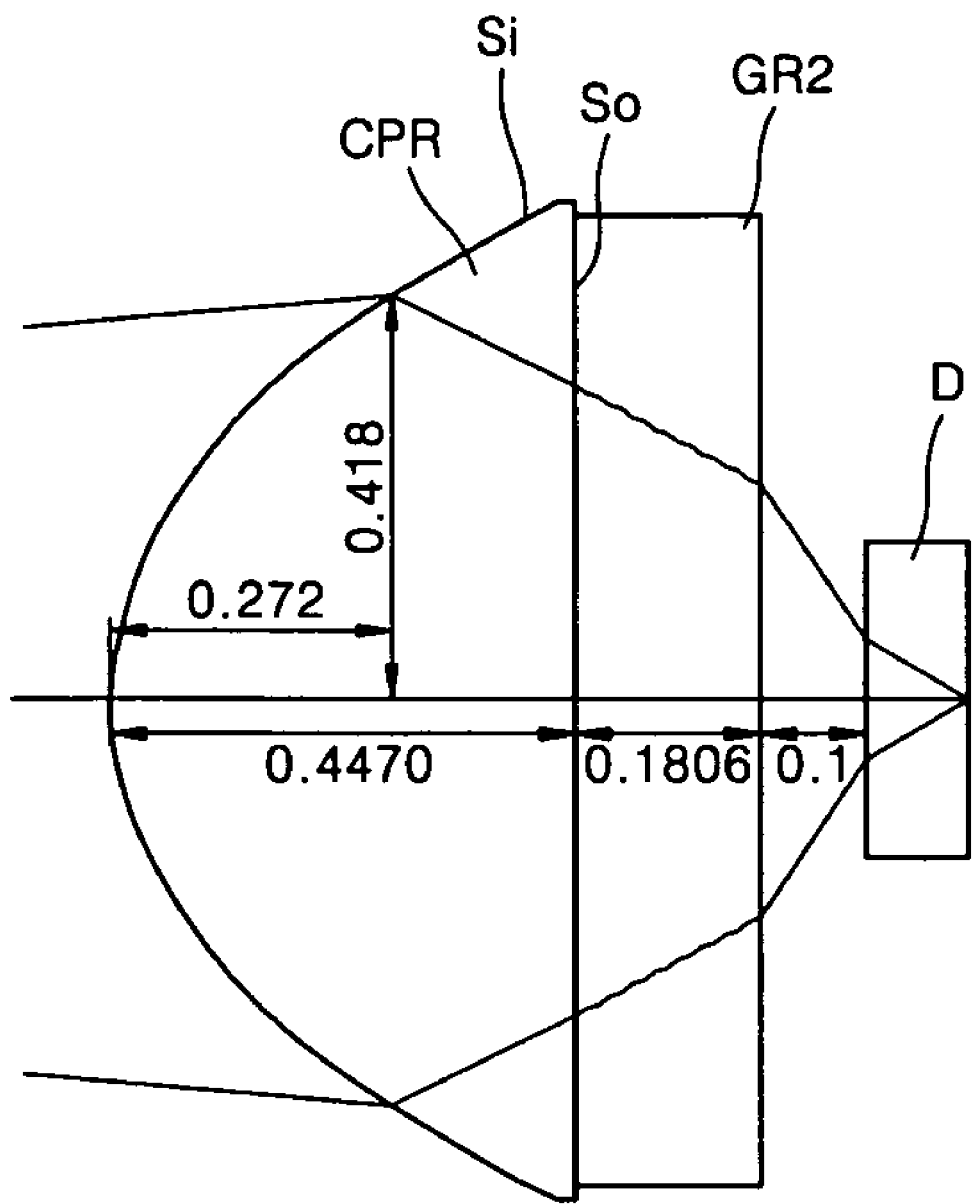
FIG. 7 is a schematic sectional view of an objective optical system according to a third preferred embodiment of the present invention.

When the plano-convex diffractive lens PCD is disposed in the optical path of light emitted from the GRIN lens GR2, a refractive lens (not shown) may be further disposed in an optical path of light incident on the GRIN lens GR2. Or, when a convex-plano diffractive lens CPD is disposed in the optical path of light incident on the GRIN lens GR2, a refractive lens can be further disposed in the optical path of light emitted from the GRIN lens GR2 as shown in FIG. 7. Here, the number of the GRIN lens, the diffractive optical lens, and the refractive lens can be determined according to necessity to obtain desired functions.

Figure 6:
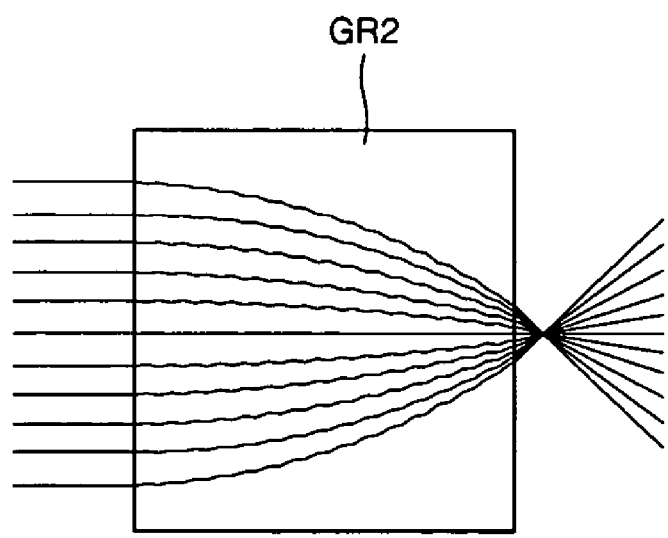
FIG. 6 is a diagram illustrating an optical path of light passing through a GRIN sheet lens.

FIG. 6 is a diagram illustrating an optical path of light passing through a GRIN sheet lens GR2. Referring to FIG. 6, the optical path of light passing through the GRIN lens GR2 is refracted due to a refractive index which is continuously changed. To be specific, the light passing through the GRIN lens GR2 is refracted at a contact point where different refractive indices coincide and is focused on an optical disk D. Since the GRIN lens GR 2 shown in FIG. 6 can be manufactured to have a thickness less than 1 mm, it is suitable for use as a collimator for communications and for use in an ultra-thin optical pickup.

FIG. 7 is a schematic sectional view of an objective optical system according to a third embodiment of the present invention. Referring to FIG. 7, the objective optical system includes a convex-plano refractive lens CPR having a convex aspherical incident surface si and a planar emissive surface so and a GRIN lens GR2 whose refractive index n(z) is changed in an axial direction according to Equation 2 which is equal to Equation 5. For example, when the convex-plano refractive lens CPR has a thickness of 0.4470 mm and an etching depth z of 0.272 mm from the aspherical surface, a clear aperture may be 2×0.418. The GRIN lens GR2 has a thickness of 0.1806 mm and a working distance between an optical disk D and the GR2 is 0.1 mm.

Table 1 shows the simulation results when using laser diodes emitting blue light beams of wavelengths 400 nm, 405 nm, and 410 nm to condense light using the objective optical system shown in FIG. 7, simulation results are shown in Table 1.

TABLE 1

| Wavefront error (on/off axis = 0.01 mm) | |
|---|---|
| 410 nm | 0.0215λ/0.0340λ |
| 405 nm | 0.0042λ/0.0263λ |
| 400 nm | 0.0236λ/0.0347λ |
| Refractive index | N(z) |
| Surface decenter/tilt tolerance | 10 μm/0.03° |
| Group decenter/tilt tolerance | 10 μm/0.1° |
| Coba | 175 μm |
| Maximum and minimum of refractive index in GRIN lens | n_max = 1.768443<br>n_min = 1.635360 |
| Rate of change in refractive index (Δn) | 8.14% |
| NA | 0.085 |
| NAO | 0.09 |
| LD | SLD3231VL |

A wavefront error is one factor in predicting aberration in an optical design. The spot size of a focused light is determined to be within a diffraction limit if a predetermined optical system has a waveform error of less than 0.07 λ. Since various aberration types including spherical aberration, coma aberration, distortion aberration, and astigmatism are rarely generated within the diffraction limit, simply measuring a wavefront error can predict whether or not an aberration has been generated.

Referring to Table 1, for a laser beam having a wavelength of 400 nm, the wavefront error on the axis is 0.0236% and the wavefront error off the axis is 0.0347 λ. For a laser beam having a wavelength of 405 nm, the wavefront error on the axis is 0.0042 λ and the wavefront error off the axis is 0.0263 λ. For a laser beam having a wavelength of 410 nm, the wavefront error on the axis is 0.0215 λ and the wavefront error off the axis is 0.0340 λ. Thus, the objective optical system consistent with the present invention shows that each of the wavefront errors, even in the wide wavelengths of 400 to 410 nm, is smaller than the diffraction limit of 0.07 λ when temperatures of the laser diodes are changed. Accordingly, it is excellent in correcting chromatic aberration.

Further, a surface decenter and a lens group decenter, which are major tolerances, are within 10 μm, and a tilt tolerance in the surface is 0.03° and a tilt tolerance in the lens group is 0.1°. Thus, the objective optical system consistent with the present invention has a yield higher than 80% and is not sensitive to any tolerance.

The objective optical system of the present invention employs a GRIN lens with a high numerical aperture (NA) which is continuously changed in an axial direction and/or a direction perpendicular to the axial direction, and accordingly, enables an ultra-thin optical pickup to be realized and a manufacturing process to be simplified by increasing a tolerance through aberration correction.

As described above, according to the objective optical system of the present invention, since a GRIN lens with a high NA having a high aberration correction effect is employed, a higher tolerance can be acquired, a manufacturing process can be simplified, and an ultra-thin optical pickup can be realized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An objective optical system of an optical pickup, comprising a gradient index lens whose refractive index varies in an axial direction and increase in a direction from the center to the surface of the gradient index lens, perpendicular to the axial direction.

2. The objective optical system of claim 1, wherein the gradient index lens has a refractive index n satisfying the following equation:

$$n(r, z) = \sum_{i=0} n_{r2i} r^{2i} + \sum_{j=0} n_{zj} z^j$$

where z is a distance from the center of the lens in the axial direction and r is a distance from the center of the lens in the direction perpendicular to the axial direction.

3. The objective optical system of claim 1, wherein the gradient index lens having a refractive index n satisfies the following equation:

$$n(z) = \sum_{j=0} n_j z^j$$

where z is a distance from the center of the lens in an axial direction.

4. The objective optical system of claim 1, wherein the gradient index lens having a refractive index n satisfies the following equation:

$$n(r) = \sum_{j=0} n_{2j} r^{2j},$$

where r is a distance from the center of the lens in a direction perpendicular to an axial direction.

5. The objective optical system of claim 1, wherein the gradient index lens has an incident surface which is a convex aspherical surface or a convex spherical surface.

6. The objective optical system of claim 5, wherein the gradient index lens has an emissive surface which is a planar surface.

7. The objective optical system of claim 5, wherein the gradient index has an emissive surface which is a convex aspherical surface or a convex spherical surface.

8. The objective optical system of claim 5, wherein the gradient index lens has an emissive surface which is a concave aspherical surface or a concave spherical surface.

9. The objective optical system of claim 1, wherein the gradient index lens is a sheet lens.

10. The objective optical system of claim 9, wherein a refractive lens having a convex incident surface and a planar emissive surface is disposed in an optical path of light incident on the gradient index lens.

11. The objective optical system of claim 10, wherein a diffractive optical lens having a diffractive surface is disposed in an optical path of light emitted from the gradient index lens.

12. The objective optical system of claim 9, wherein a refractive lens having a planar incident surface and a convex emissive surface is disposed in an optical path of light emitted from the gradient index lens.

13. The objective optical system of claim 12, wherein a diffractive optical lens having a diffractive surface is disposed in an optical path of light incident on the gradient index lens.

14. The objective optical system of claim 9, wherein a diffractive optical lens having a diffractive surface is further arranged on an optical path of light incident on or emitted from the gradient index lens.

15. The objective optical system of claim 1, wherein a refractive lens is disposed in an optical path incident on or emitted from the gradient index lens.

16. The objective optical system of claim 1, wherein a diffractive optical lens having a diffractive surface is disposed in an optical path of light incident on or emitted from the gradient index lens.

17. The objective optical system of claim 1, wherein a refractive lens is disposed in an optical path of light incident on the gradient index lens, and a diffractive optical lens having a diffractive surface is disposed in an optical path of light emitted from the gradient index lens.

18. The objective optical system of claim 1, wherein a diffractive optical lens having a diffractive surface is disposed in an optical path of light incident on the gradient index lens, and a refractive lens is disposed an optical path of light emitted from the gradient index lens.

19. An objective optical system of an optical pickup, comprising a gradient index lens whose refractive index increases at least in the axial direction and a direction perpendicular to the axial direction, wherein the gradient index lens has a refractive index n satisfying the following equation:

$$n(r, z) = \sum_{i=0} n_{r2i} r^{2i} + \sum_{j=0} n_{zj} z^j$$

where z is a distance from the center of the lens in the axial direction and r is a distance from the center of the lens in the direction perpendicular to the axial direction.

20. An objective optical system of an optical pickup, comprising a gradient index lens whose refractive index increases at least in the axial direction and a direction perpendicular to the axial direction, wherein the gradient index lens has a refractive index n satisfying the following equation:

$$n(r) = \sum_{j=0} n_{r2j} r^{2j}$$

where r is a distance from the center of the lens in a direction perpendicular to an axial direction.

* * * * *